US009459902B2

(12) United States Patent
Noel et al.

(10) Patent No.: US 9,459,902 B2
(45) Date of Patent: Oct. 4, 2016

(54) MEMORY DUPLICATION BY DESTINATION HOST IN VIRTUAL MACHINE LIVE MIGRATION

(71) Applicant: Red Hat Israel, Ltd., Raanana (IL)

(72) Inventors: Karen Noel, Pembroke, NH (US); Michael Tsirkin, Yorkneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 341 days.

(21) Appl. No.: 13/968,860

(22) Filed: Aug. 16, 2013

(65) Prior Publication Data

US 2015/0052323 A1    Feb. 19, 2015

(51) Int. Cl.
*G06F 3/06* (2006.01)
*G06F 9/455* (2006.01)
*G06F 12/00* (2006.01)
*G06F 9/44* (2006.01)

(52) U.S. Cl.
CPC ......... *G06F 9/45558* (2013.01); *G06F 9/4413* (2013.01); *G06F 12/00* (2013.01); *G06F 2009/4557* (2013.01); *G06F 2009/45583* (2013.01)

(58) Field of Classification Search
CPC ..... G06F 3/0647; G06F 3/0619; G06F 3/067
See application file for complete search history.

(56) References Cited

U.S. PATENT DOCUMENTS

| | | | |
|---|---|---|---|
| 6,789,156 B1 | 9/2004 | Waldspurger | |
| 6,961,941 B1 * | 11/2005 | Nelson | G06F 9/45533 719/310 |
| 7,519,696 B2 * | 4/2009 | Blumenau | G06F 3/0605 709/220 |
| 7,620,766 B1 | 11/2009 | Waldspurger | |
| 7,818,495 B2 * | 10/2010 | Tanaka | G06F 3/0608 711/103 |
| 8,151,263 B1 | 4/2012 | Venkitachalam et al. | |

(Continued)

OTHER PUBLICATIONS

Umesh Deshpande, Xiaoshuang Wang, and Kartik Gopalan. 2011. Live gang migration of virtual machines. In Proceedings of the 20th international symposium on High performance distributed computing (HPDC '11). ACM, New York, NY, USA, 135-146.*

(Continued)

*Primary Examiner* — David X Yi
*Assistant Examiner* — Ramon A Mercado
(74) *Attorney, Agent, or Firm* — Lowenstein Sandler LLP

(57) ABSTRACT

Systems and methods for memory de-duplication in a virtual machine undergoing live migration. An example method may comprise: receiving, by a hypervisor executing on a destination host computer system, a first virtual address and a corresponding physical memory range identifier, the physical memory range identifier identifying a first physical memory range on an origin host computer system, the first virtual address identifying a first virtual memory range mapped to the first physical memory range in a virtual address space of a first virtual machine undergoing live migration from the origin host computer system to the destination host computer system; identifying a second virtual address corresponding to the physical memory range identifier, the second virtual address identifying a second virtual memory range in a virtual address space of a second virtual machine undergoing live migration from the origin host computer system to the destination host computer system; identifying a destination physical address corresponding to the second virtual address, the destination physical address identifying a second physical memory range on the destination host computer system; and mapping, on the destination host computer system, the first virtual address to the destination physical address.

16 Claims, 4 Drawing Sheets

(56) References Cited

U.S. PATENT DOCUMENTS

| | | | |
|---|---|---|---|
| 8,244,956 B2 | 8/2012 | Laor et al. | |
| 8,244,957 B2 | 8/2012 | Eidus et al. | |
| 8,327,060 B2 | 12/2012 | Heim | |
| 8,538,933 B1* | 9/2013 | Hu | G06F 3/0641 707/692 |
| 8,549,518 B1* | 10/2013 | Aron | G06F 9/45558 718/1 |
| 8,949,431 B2* | 2/2015 | Bercovici | G06F 9/45533 709/226 |
| 2006/0224844 A1* | 10/2006 | Kano | G06F 3/0605 711/162 |
| 2007/0300034 A1* | 12/2007 | Aoyama | G06F 3/0619 711/170 |
| 2008/0005201 A1* | 1/2008 | Ting | G06F 11/1435 |
| 2008/0222375 A1* | 9/2008 | Kotsovinos | G06F 9/5083 711/162 |
| 2009/0293058 A1* | 11/2009 | Ahn | G06F 21/10 718/1 |
| 2010/0030998 A1 | 2/2010 | Kiriansky | |
| 2011/0066786 A1* | 3/2011 | Colbert | G06F 9/45558 711/6 |
| 2011/0161723 A1* | 6/2011 | Taleck | G06F 17/30156 714/4.11 |
| 2011/0179250 A1* | 7/2011 | Matsuzawa | G06F 3/0608 711/209 |
| 2011/0289296 A1* | 11/2011 | Saito | G06F 3/0613 711/209 |
| 2012/0017027 A1 | 1/2012 | Baskakov et al. | |
| 2012/0023292 A1* | 1/2012 | Saito | G06F 1/3203 711/114 |
| 2012/0054409 A1 | 3/2012 | Block et al. | |
| 2012/0084445 A1* | 4/2012 | Brock | G06F 9/5077 709/226 |
| 2012/0089764 A1 | 4/2012 | Baskakov et al. | |
| 2012/0096460 A1* | 4/2012 | Sekiguchi | G06F 9/45558 718/1 |
| 2012/0151169 A1* | 6/2012 | Mori | G06F 3/0641 711/166 |
| 2012/0233285 A1* | 9/2012 | Suzuki | G06F 9/4856 709/216 |
| 2012/0254131 A1* | 10/2012 | Al Kiswany | G06F 17/30233 707/692 |
| 2012/0278569 A1* | 11/2012 | Kawakami | G06F 3/0608 711/162 |
| 2012/0297091 A1* | 11/2012 | Haga | G06F 13/385 710/3 |
| 2012/0317084 A1* | 12/2012 | Liu | G06F 3/0641 707/692 |
| 2013/0054919 A1* | 2/2013 | Auvenshine | G06F 3/0608 711/165 |
| 2013/0097377 A1 | 4/2013 | Satoyama et al. | |
| 2013/0238855 A1* | 9/2013 | Satran | G06F 12/0871 711/118 |
| 2013/0262801 A1* | 10/2013 | Sancheti | G06F 3/065 711/162 |
| 2013/0275708 A1* | 10/2013 | Doi | G06F 9/4856 711/165 |
| 2013/0318051 A1* | 11/2013 | Kumar | G06F 17/30156 707/692 |
| 2014/0181804 A1* | 6/2014 | Sakata | G06F 9/455 718/1 |
| 2015/0039717 A1* | 2/2015 | Chiu | H04L 67/2842 709/214 |
| 2015/0052322 A1 | 2/2015 | Tsirkin et al. | |

OTHER PUBLICATIONS

David A. Rusling, "The Linux Kernel", Jul. 15, 1999.*
Jo, et al., "Efficient Live Migration of Virtual Machines Using Shared Storage," VEE'13 Mar. 16-17, 2013, Houston, Texas.
Zhang, et al., "Exploiting Data Deduplication to Accelerate Live Virtual Machine Migration," 2010 IEEE International Conference on Cluster Computing.
Tsirkin, Michael "Qemu-devel," Mar. 20, 2013, http://lists.nongnu.org/archive/html/qemu-devel/2013-03/msg03558.html.
Wood, et al. "Memory Buddies" Exploiting Page Sharing for Smart Colocation in Virtualized Data Centers, VEE'09 Mar. 11-13, 2009, Washington, DC, USA.
Sapuntzakis, et al., "Optimizing the Migration of Virtual Computers," USENIX Association, 5th Symposium on Operating Systems Design and Implementation.
Deshpande, "MemX: Virtualization of Cluster-Wide Memory", IEEE, 2010.
Hines, Michael R., Gopalan, Kartik, "Post-Copy Based Live Virtual Machine Migration Using Adaptive Pre-Paging and Dynamic Self-Ballooning" VEE '09 Proceedings of the 2009 ACM SIGPLAN/SIGOPS international conference on Virtual execution environments, 2009.
Suzaki, Kuniyasu, "Memory Deduplication as a Threat to the Guest OS", Proceedings of the Fourth European Workshop on System Security Article No. 1 ACM New York, NY, USA ©2011.
Tsirkin, Michael, and Noel, Karen, "Systems and Methods for Memory Deduplication by Origin Host in Virtual Machine Live Migration", U.S. Appl. No. 13/968,795, filed Aug. 16, 2013.
USPTO Office Action for U.S. Appl. No. 13/968,795 mailed Aug. 27, 2015.

* cited by examiner

MEMORY DUPLICATION BY DESTINATION HOST IN VIRTUAL MACHINE LIVE MIGRATION

TECHNICAL FIELD

The present disclosure is generally related to virtualized computer systems, and is more specifically related to systems and methods for virtual machine live migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
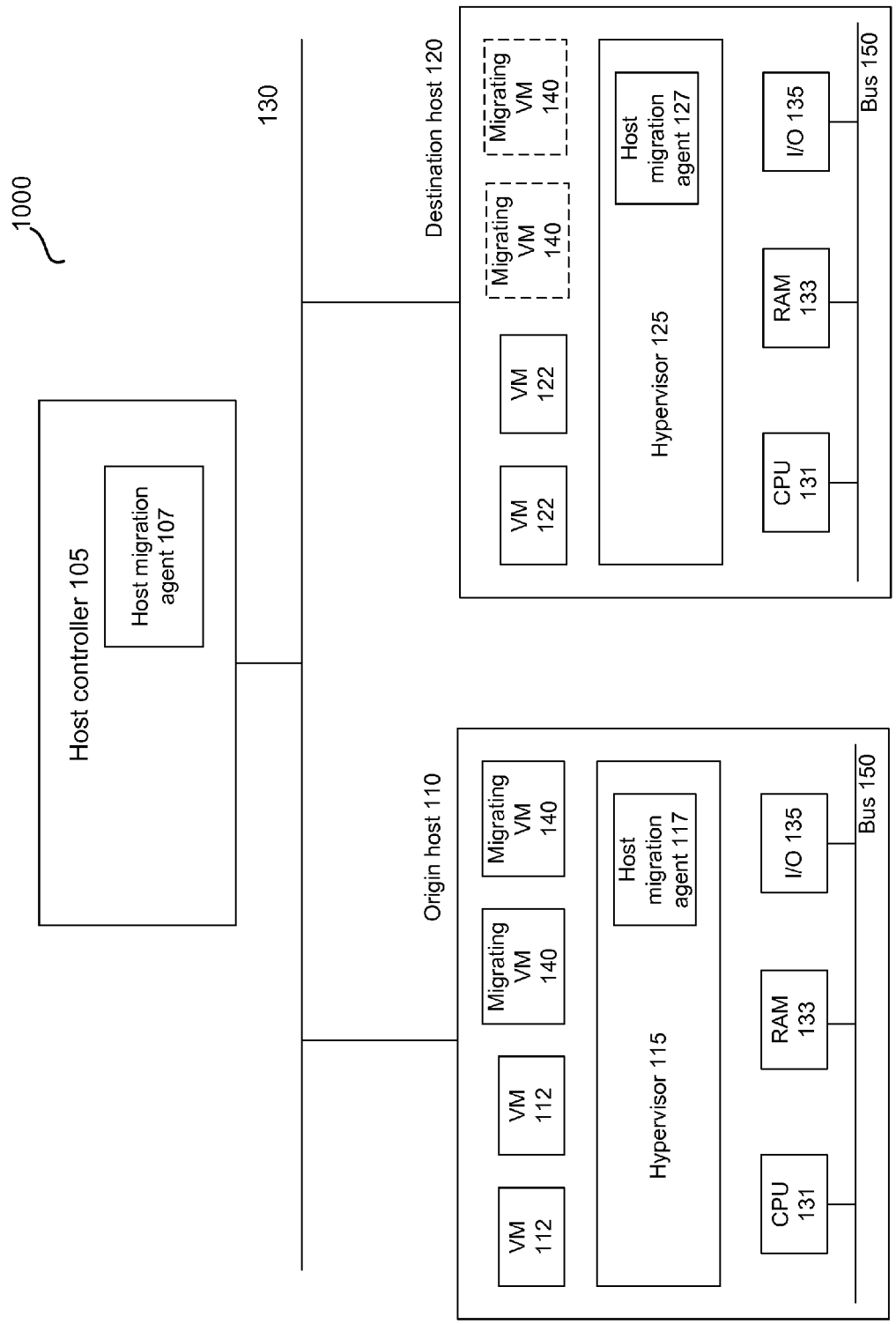
FIG. 1 depicts a high-level component diagram of one illustrative embodiment of a computer system 1000 in accordance with one or more aspects of the present disclosure.

Described herein are methods and systems for memory de-duplication in a virtual machine undergoing live migration. "Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

In certain systems, a migration agent may copy the state of the virtual machine being migrated, including a plurality of memory pages, from the origin host to the destination host while the virtual machine is still running at the origin host. Upon completing the memory copying operation, the migration agent may re-copy the memory pages which have been modified, or became "dirty," during the memory copying operation.

In certain systems, upon completing the initial migration stage, the migration agent may switch to a post-copy migration stage, by stopping the virtual machine at the origin host and resuming the virtual machine at the destination host. In the post-copy stage, a page fault may be generated by the hypervisor responsive to detecting the virtual machine's attempt to access a memory page which has not yet been transferred, and the page may be transferred from the origin host to the destination host responsive to the page fault.

As the execution state of a virtual machine being migrated may have a size of several gigabytes, the network throughput may become a constraint, especially when several virtual machines are being migrated concurrently. In order to improve the overall efficiency of the live migration process, the amount of data transmitted over the network may be optimized in accordance with one or more aspect of the present disclosure.

In certain systems, the amount of data to be transmitted over the network in a live migration of a virtual machine may be reduced by memory de-duplication, i.e., by identifying memory pages having identical contents, and transmitting such memory pages to the destination host computer system only once. However, upon receiving de-duplicated contents of several virtual memory pages, a conventional hypervisor executed by the destination host computer system would create several physical memory pages storing duplicates of the contents and map a virtual memory page to each of the physical memory pages.

To further improve the memory management aspect of the virtual machine migration process, the destination hypervisor may avoid creating duplicate memory pages, by identifying two or more virtual memory ranges as having identical contents if they are mapped to the same physical memory range on the origin host computer system.

In one illustrative example, the hypervisor executing on the destination host computer system may maintain a data structure mapping origin physical addresses to virtual memory addresses. Responsive to receiving a virtual address and the corresponding origin physical address, the destination hypervisor may look up the origin physical address in the memory mapping data structure. If a memory mapping entry with the matching physical address is found, the two virtual memory ranges sharing the same physical address may be identified as having identical contents. Hence, the destination hypervisor may avoid creating duplicate memory pages by mapping the newly received virtual address to the destination physical address corresponding to the identified data structure entry.

Various aspects of the above referenced methods and systems are described in details herein below by way of examples, rather than by way of limitation.

FIG. 1 depicts a high-level component diagram of one illustrative example of a computer system 1000 in accordance with one or more aspects of the present disclosure. Computer system 1000 may comprise computer systems 110 and 120 interconnected via a network 130. Each of host computer systems 110 and 120 may comprise one or more processors 131 communicatively coupled to memory devices 133 and input/output (I/O) devices 135. Local connections within each of hosts 110 and 120, including connections between processors 131, memory 133, and I/O devices 135, may be provided by one or more local buses 150 of suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Each of host computer systems 110 and 120 may run a plurality of virtual machines 112 and 122, by executing hypervisors 115 and 125, respectively. Each of hypervisors 115 and 125 may abstract the physical layer, including processors, memory, and I/O devices, and present this abstraction to virtual machines 112, 122 as virtual devices, including virtual processors, virtual memory, and virtual I/O devices.

A virtual machine 112, 122 may execute a guest operating system which may utilize the underlying virtual devices, including virtual processors, virtual memory, and virtual I/O devices. One or more applications may be running on a virtual machine 112 under the guest operating system.

As schematically illustrated by FIG. 1, each of hosts 110 and 120 may be communicatively coupled to a host controller 105 which may reside on a designated computer system or on one of hosts 110, 120. Host controller 105 may manage a plurality of virtual machines, including virtual machines 112 and 122. Host controller 105 may create a virtual machine, delete a virtual machine, and perform other virtual machine management functions. In certain implementations, host controller 105 may comprise a migration agent 107 which may manage live migration of virtual machines between host computer systems 110 and 120 in accordance with one or more aspects of the present disclosure. In certain implementations, host computer systems 110 and 120 may comprise host migration agents 117 and 127, respectively, designed to perform at least some of the virtual machine migration management functions in accordance with one or more aspects of the present disclosure.

For illustrative purposes, host computer system 110 may be referred to as the origin host from which one or more virtual machines 140 may migrate to host computer system 120, which may accordingly be referred to as the destination host. Live migration may involve copying the virtual machine execution state from the origin host to the destination host. The virtual machine execution state may comprise the memory state, the virtual processor state, the virtual devices state, and/or the connectivity state. Host migration agents 107, 117, and/or 127 may copy, over network 130, the execution state of migrating virtual machine 140, including a plurality of memory pages, from origin host 110 to destination host 120 while virtual machine 140 is still running on origin host 110.

In certain implementations, the amount of data to be transmitted over the network in a live migration of a virtual machine may be reduced by memory de-duplication. Origin hypervisor 115 may identify memory pages having identical contents and transmit the contents of duplicate memory pages to destination host computer system 120 only once.

Figure 2:
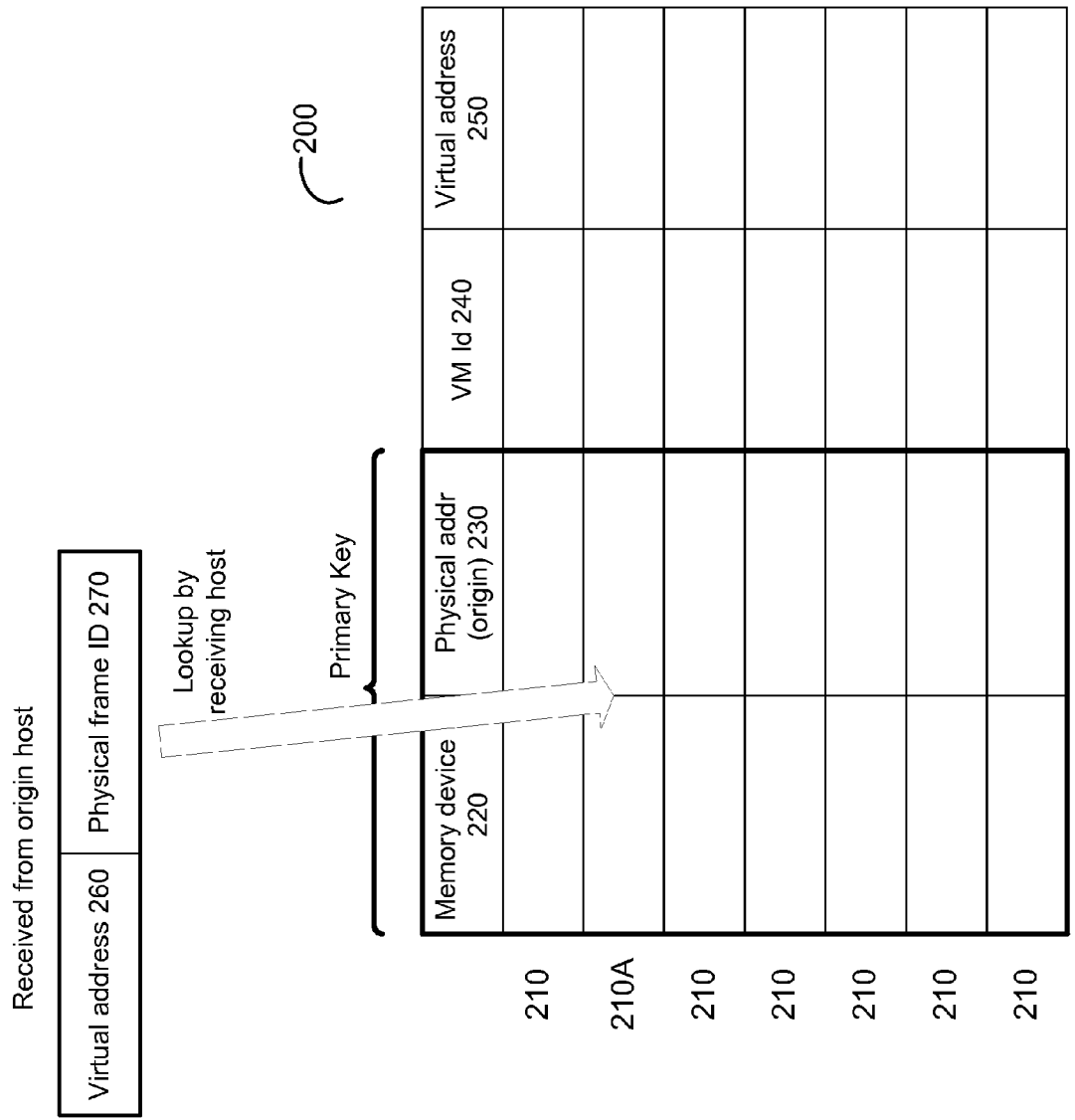
FIG. 2 schematically illustrates a data structure comprising a plurality of memory mapping entries, in accordance with one or more aspects of the present disclosure.

In certain implementations, destination hypervisor 125 may avoid creating duplicate memory pages by identifying two or more virtual memory ranges as having identical contents if they are mapped to the same physical memory range on origin host computer system 110. In one illustrative example, destination hypervisor 125 may maintain a data structure mapping origin physical memory range identifiers to virtual memory addresses. As schematically illustrated by FIG. 2, destination hypervisor 125 may maintain a data structure 200 comprising a plurality of memory mapping entries 210. Each memory mapping entry 210 may comprise a physical memory range identifier on the origin host computer system and the corresponding virtual machine identifier 240 and virtual memory address 250.

In an illustrative example, the origin physical memory range identifier may comprise a memory device identifier 220 identifying a memory device on which the physical memory page resides, and a physical address 230 on the identified memory device. Alternatively, the origin physical memory range identifier may be provided by a content identifier, such as a hash of the memory page contents. In certain implementations, to improve the efficiency of detecting duplicate memory ranges, memory mapping structure 200 may be indexed by the origin physical frame identifier, e.g., by the memory device identifier and by physical address on the memory device, as schematically illustrated by FIG. 2.

In certain implementations, a virtual memory range may comprise one or more virtual memory pages. Each memory mapping entry 210 may further comprise the size of the virtual memory range. Alternatively, all memory mapping entries 210 may reference virtual memory ranges of a pre-defined size.

As schematically illustrated by FIG. 2, during a virtual machine migration process, the host migration agent may transmit to the destination host a virtual address 260 identifying a virtual memory range and the corresponding physical memory range identifier 270 on the origin host computer system (e.g., the memory device identifier and the physical address on the memory device). Responsive to receiving the virtual address and the corresponding memory range identifier, the destination hypervisor may look up the memory range identifier in the memory mapping data structure.

If a memory mapping entry 210 with the matching memory range identifier is found, the two virtual memory ranges sharing the same memory range identifier (e.g., the physical frame number) may be identified as having identical contents. Hence, the destination hypervisor may avoid creating of duplicate memory pages by mapping the newly received virtual address to the destination physical address corresponding to the identified data structure entry 210.

If a virtual machine later attempts to modify the contents of one of the two or more virtual memory ranges sharing the same physical memory range, the destination hypervisor may de-couple the two or more virtual memory ranges. The destination hypervisor may copy a modified virtual memory range to a new physical memory range, and map the modified virtual memory range to the new physical address.

In a further aspect, the identified virtual memory ranges having identical contents may be mapped into a virtual memory address space of a virtual machine undergoing live migration from origin computer system 110 to destination host computer system 120. Alternatively, the identified virtual memory ranges having identical contents may be mapped into virtual memory address spaces of two virtual machines undergoing live migration from origin host computer system 110 to destination host computer system 120.

Figure 3:
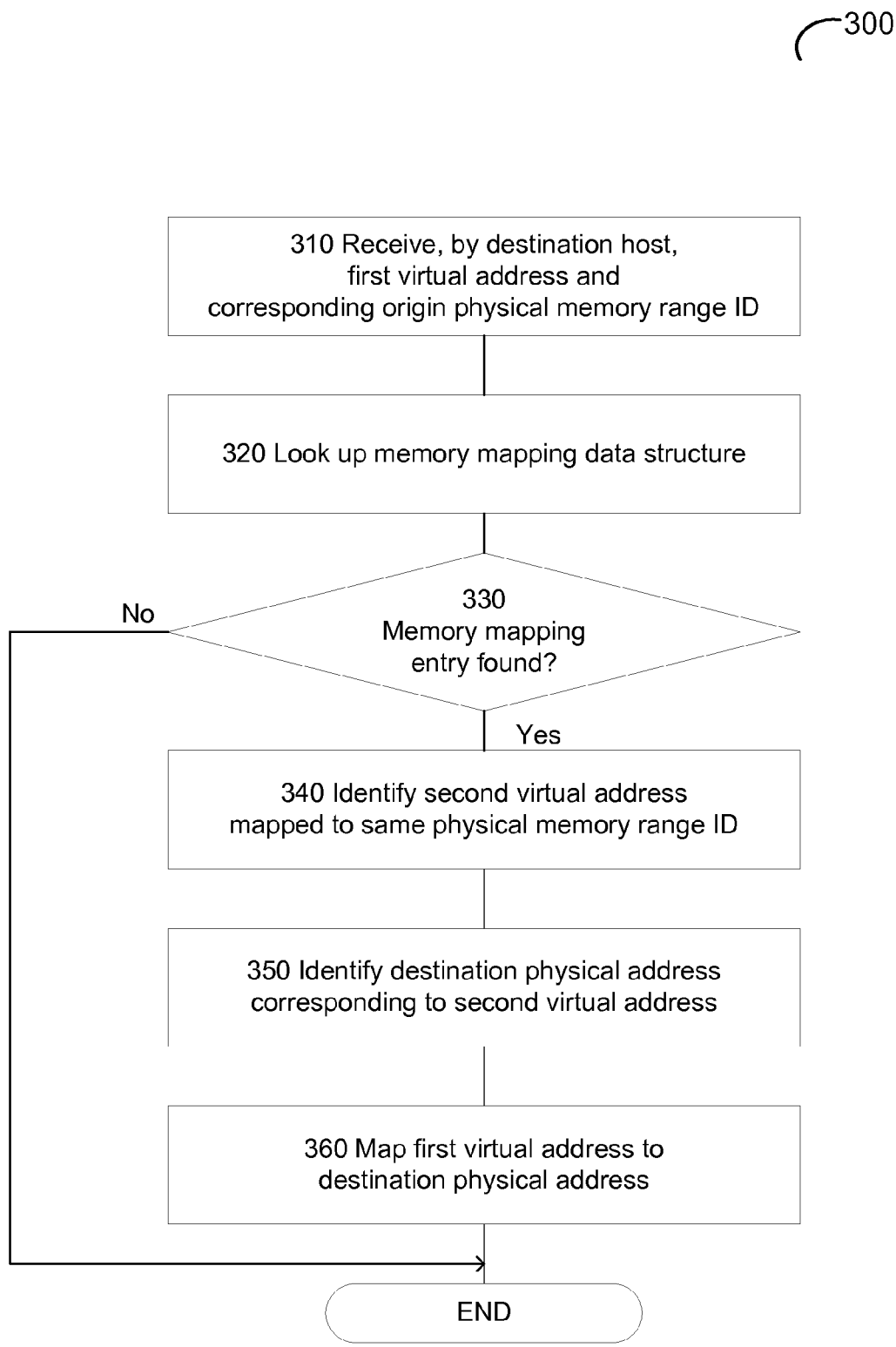
FIG. 3 depicts a flow diagram of a method for memory de-duplication in a virtual machine undergoing live migration, in accordance with one or more aspects of the present disclosure.

FIG. 3 depicts a flow diagram of one embodiment of a method 300 for memory de-duplication in a virtual machine undergoing live migration. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more physical processors of the computer system executing the method.

At block 310, the destination hypervisor may receive a virtual address identifying a virtual memory range and the corresponding physical memory range identifier on the origin host computer system (e.g., the memory device identifier and the physical address on the memory device).

At block 320, the destination hypervisor may look up the memory range identifier in a data structure mapping origin physical memory range identifiers to virtual memory addresses.

Responsive to ascertaining, at block 330, that a memory mapping entry having a matching memory range identifier is found in the memory mapping data structure, the processing may continue at block 340; otherwise, the method may terminate.

At block 340, the hypervisor may retrieve, from the data structure, a second virtual address mapped to the same physical memory range identifier.

At block 350, the hypervisor may identify a destination physical address corresponding to the second physical address.

At block 360, the hypervisor may map the first virtual address to the destination physical address corresponding to the identified data structure entry. Upon completing the operations referenced by block 360, the method may terminate.

Figure 4:
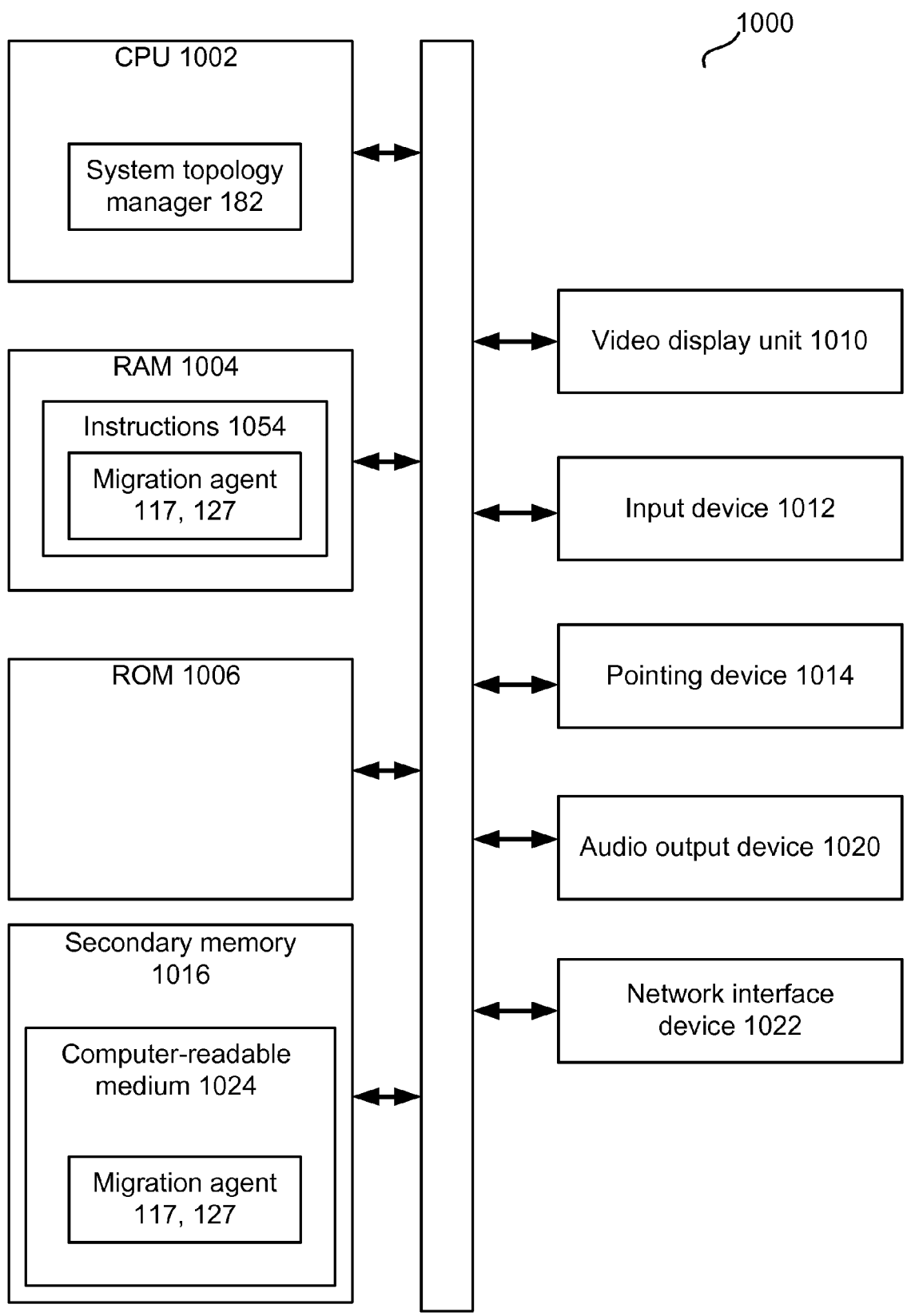
FIG. 4 depicts a block diagram of an illustrative computer system operating in accordance with the examples of the present disclosure.

FIG. 4 depicts an example computer system 1000 within which a set of instructions, for causing the computer system to perform any one or more of the methods described herein, may be executed. In certain implementations, computer system 1000 may correspond to the host computer system 110, 120 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions of migration agent 117, 127 implementing method 300 of memory de-duplication in a virtual machine undergoing live migration. Instructions of migration agent 117, 127 may also reside, completely or partially, within main memory 1004 and/or within processor 1002 during execution thereof by the computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
receiving, by a processor of a destination host computer system, a first virtual address and a corresponding source physical address, the source physical address identifying a first physical memory portion on an origin host computer system, the first virtual address identifying a first virtual memory address range mapped to the first physical memory portion in a virtual address space of a first virtual machine undergoing live migration from the origin host computer system to the destination host computer system;
identifying a second virtual address corresponding to the source physical address, the second virtual address identifying a second virtual memory address range in a virtual address space of a second virtual machine undergoing live migration from the origin host computer system to the destination host computer system;
identifying a destination physical address corresponding to the second virtual address, the destination physical address identifying a second physical memory portion on the destination host computer system;
mapping, on the destination host computer system, the first virtual address to the destination physical address;
responsive to detecting a modification of a virtual memory page of the first virtual memory address range, copying, to a new physical memory page, a physical memory page corresponding to the virtual memory page; and
mapping the modified virtual memory page to the new physical memory page.

2. The method of claim 1, wherein identifying the second virtual address further comprises looking up the source physical address in a data structure comprising a plurality of memory mapping entries, each memory mapping entry mapping a virtual memory address range to a physical memory portion.

3. The method of claim 1, wherein the source physical address comprises at least one of a memory device identifier and a memory address on a memory device identified by the memory device identifier.

4. The method of claim 1, wherein the destination physical address comprises a memory device identifier and a memory address on a memory device identified by the memory device identifier.

5. The method of claim 1, wherein the physical memory portion comprises one or more physical memory pages.

6. The method of claim 1, wherein the first virtual memory address range comprises one or more virtual memory pages.

7. The method of claim 1, wherein the second virtual memory address range comprises one or more virtual memory pages.

8. A system comprising:
a memory comprising a first physical memory portion; and
a processor, operatively coupled to the memory, to:
receive a first virtual address and a corresponding source physical address, the source physical address identifying the first physical memory portion on an origin host computer system, the first virtual address identifying a first virtual memory address range mapped to the first physical memory portion in a virtual address space of a first virtual machine undergoing live migration from the origin host computer system to a destination host computer system;
identify a second virtual address corresponding to the source physical address, the second virtual address identifying a second virtual memory address range in a virtual address space of a second virtual machine undergoing live migration from the origin host computer system to the destination host computer system;
identify a destination physical address corresponding to the second virtual address, the destination physical address identifying a second physical memory portion on the destination host computer system;
map, on the destination host computer system, the first virtual address to the destination physical address;
responsive to detecting a modification of a virtual memory page of the first virtual memory address range, copy, to a new physical memory page, a physical memory page corresponding to the virtual memory page; and
map the modified virtual memory page to the new physical memory page.

9. The system of claim 8, wherein the processor is further to provide a data structure comprising a plurality of memory mapping entries, each memory mapping entry mapping a virtual memory address range to a physical memory portion.

10. The system of claim 8, wherein the source physical address comprises at least one of a memory device identifier and a memory address on a memory device identified by the memory device identifier.

11. The system of claim 8, wherein the destination physical address comprises a memory device identifier and a memory address on a memory device identified by the memory device identifier.

12. The system of claim 8, wherein the physical memory portion comprises one or more physical memory pages.

13. A computer-readable non-transitory storage medium comprising executable instructions that, when executed by a processor, cause the processor to:
- receive, by the processor, a first virtual address and a corresponding source physical address, the source physical address identifying a first physical memory portion on an origin host computer system, the first virtual address identifying a first virtual memory address range mapped to the first physical memory portion in a virtual address space of a first virtual machine undergoing live migration from the origin host computer system to a destination host computer system;
- identify a second virtual address corresponding to the source physical address, the second virtual address identifying a second virtual memory address range in a virtual address space of a second virtual machine undergoing live migration from the origin host computer system to the destination host computer system;
- identify a destination physical address corresponding to the second virtual address, the destination physical address identifying a second physical memory portion on the destination host computer system;
- map, on the destination host computer system, the first virtual address to the destination physical address;
- responsive to detecting a modification of a virtual memory page of the first virtual memory address range, copy, to a new physical memory page, a physical memory page corresponding to the virtual memory page; and
- map the modified virtual memory page to the new physical memory page.

14. The computer-readable non-transitory storage medium of claim 13, further comprising executable instructions causing the processor to provide a data structure comprising a plurality of memory mapping entries, each memory mapping entry mapping a virtual memory address range to a physical memory portion.

15. The computer-readable non-transitory storage medium of claim 13, wherein the source physical address comprises at least one of a memory device identifier and a memory address on a memory device identified by the memory device identifier.

16. The computer-readable non-transitory storage medium of claim 13, wherein the destination physical address comprises a memory device identifier and a memory address on a memory device identified by the memory device identifier.

* * * * *